(12) United States Patent
Azgin et al.

(10) Patent No.: US 9,774,531 B2
(45) Date of Patent: Sep. 26, 2017

(54) HASH-BASED FORWARDING IN CONTENT CENTRIC NETWORKS

(71) Applicant: Futurewei Technologies, Inc., Plano, TX (US)

(72) Inventors: Aytac Azgin, Santa Clara, CA (US); Ravishankar Ravindran, San Ramon, CA (US); Guo-Qiang Wang, Santa Clara, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 14/864,299

(22) Filed: Sep. 24, 2015

(65) Prior Publication Data

US 2016/0094553 A1 Mar. 31, 2016

Related U.S. Application Data

(60) Provisional application No. 62/056,307, filed on Sep. 26, 2014.

(51) Int. Cl.
*H04L 29/06* (2006.01)
*H04L 12/743* (2013.01)

(52) U.S. Cl.
CPC ........ *H04L 45/7453* (2013.01); *H04L 63/123* (2013.01)

(58) Field of Classification Search
CPC .................................................. H04L 63/7453
USPC ....................................................... 713/154
See application file for complete search history.

(56) References Cited

U.S. PATENT DOCUMENTS

| 9,276,902 B2* | 3/2016 | Treuhaft .......... H04L 29/12066 |
| 2004/0133675 A1* | 7/2004 | Ishiyama .......... H04L 29/12066 |
| | | 709/224 |
| 2013/0282920 A1 | 10/2013 | Zhang et al. |

OTHER PUBLICATIONS

Ravindran, et al., "Sotware-Defined Information Centric Network (ICN)," U.S. Appl. No. 14/600,222, filed Jan. 20, 2015, 33 pages.
Azgin, et al., "H2N4: Packet Forwarding on Hierarchical Hash-based Names for Content Centric Networks," ICC, 2015, 7 pages.

* cited by examiner

*Primary Examiner* — Longbit Chai
(74) *Attorney, Agent, or Firm* — Conley Rose, P.C.

(57) ABSTRACT

A method implemented by a network element (NE), comprising obtaining a first mapping between a first content name identifying a content data in a content centric network (CCN) and a first hash value of at least a portion of the first content name, wherein the first content name comprises a character string in a hierarchical namespace, receiving, via a receiver of the NE, an initial packet comprising an initial hash value from the CCN, determining, via a processor the NE, that the initial hash value in the received initial packet matches the first hash value in the obtained first mapping, replacing, via the processor, the initial hash value in the received initial packet with the first content name in the matched first mapping to produce a translated initial packet, and forwarding, via a transmitter of the NE, the translated initial packet comprising the first content name to a connected end host.

20 Claims, 14 Drawing Sheets

| Table Entry Type | Storage Requirements | | |
|---|---|---|---|
| | 60 Bytes interest Packet | 80 Bytes interest Packet | 100 Bytes interest Packet |
| PIT (name-based forwarding) | 99 Bytes | 119 Bytes | 139 Bytes |
| PIT (hash-based forwarding) | 71 Bytes | 79 Bytes | 87 Bytes |
| FIB (name-based forwarding) | 90 Bytes | 110 Bytes | 130 Bytes |
| FIB (hash-based forwarding) | 62 Bytes | 70 Bytes | Bytes |

FIG. 10

HASH-BASED FORWARDING IN CONTENT CENTRIC NETWORKS

CROSS-REFERENCE TO RELATED APPLICATIONS

The present application claims priority to U.S. Provisional Patent Application 62/056,307, filed Sep. 26, 2014 by Aytac AZGIN, et. al., and entitled "METHOD AND SYSTEM FOR HASH-BASED FORWARDING FOR CONTENT CENTRIC NETWORKS", which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In content centric networks (CCNs), a domain-wide unique name is assigned to each entity that is part of a content delivery framework. CCN entities may include data content, such as video clips or web pages, and/or infrastructure elements, such as routers, switches, or servers. In a CCN, content routers are responsible for routing user requests and content to recipients. The content routers mute packets based on name prefixes, which may be full content names of name prefixes of content names, instead of network addresses. Content delivery, such as publishing, requesting, and managing of the content, is based on the name of the content instead of the location of the content. CCNs differ from Internet Protocol (IP) networks by performing in-network content caching, which may be on a temporary basis or a more persistent basis. This may allow content to be served from the network instead of an original content server, and thus may substantially improve user experience. The cached content may be used for real time data that is fetched by the user or for persistent data that belongs to the user or to a content provider, for example, a third party provider.

SUMMARY

In one embodiment, the disclosure includes a method implemented by a network element (NE), comprising obtaining a first mapping between a first content name identifying a content data in a CCN and a first hash value of at least a portion of the first content name, wherein the first content name comprises a character string in a hierarchical namespace, receiving, via a receiver of the NE, an initial packet comprising an initial hash value from the CCN, determining, via a processor the NE, that the initial hash value in the received initial packet matches the first hash value in the obtained first mapping, replacing, via the processor, the initial hash value in the received initial packet with the first content name in the matched first mapping to produce a translated initial packet, and forwarding, via a transmitter of the NE, the translated initial packet comprising the first content name to a connected end host.

In another embodiment, the disclosure includes an NE comprising a port configured to couple to a CCN, a memory configured to store a hash table comprising a bucket entry indexed by a bucket index, wherein the bucket entry comprises a sub-entry indicating the port as an interface associated with a first hash-based content identifier (ID) comprising a first hash value, and a processor coupled to the memory and the port, wherein the processor is configured to receive a packet comprising a second hash-based content ID comprising a second hash value, locate the bucket entry in the hash table by determining that at least a first portion of the second hash value matches the bucket index, determine that at least a portion of the second hash-based content ID in the received packet matches the first hash value in the sub-entry of the located bucket entry, and forward the received packet to the CCN via the port indicated in the matched sub-entry.

In yet another embodiment, the disclosure includes a name resolution server (NRServ) comprising a receiver configured to receive a content registration request message requesting registration for a first content name in a CCN, wherein the first content name comprises a hierarchical structure in a namespace and a character string, a processor coupled to the receiver and configured to generate a hash-based content ID by applying a first hash function to the first content name, wherein the hash-based content ID comprises a same hierarchical structure as the first content name in a hash-space, and a transmitter coupled to the processor and configured to send a content registration response message indicating the hash-based content ID for the first content name in response to the received content registration request message.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 10 is a table comparing average pending interest table (PIT) and forwarding information base (FIB) storage requirements of various storage schemes.

DETAILED DESCRIPTION

It should be understood at the outset that, although illustrative implementations of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
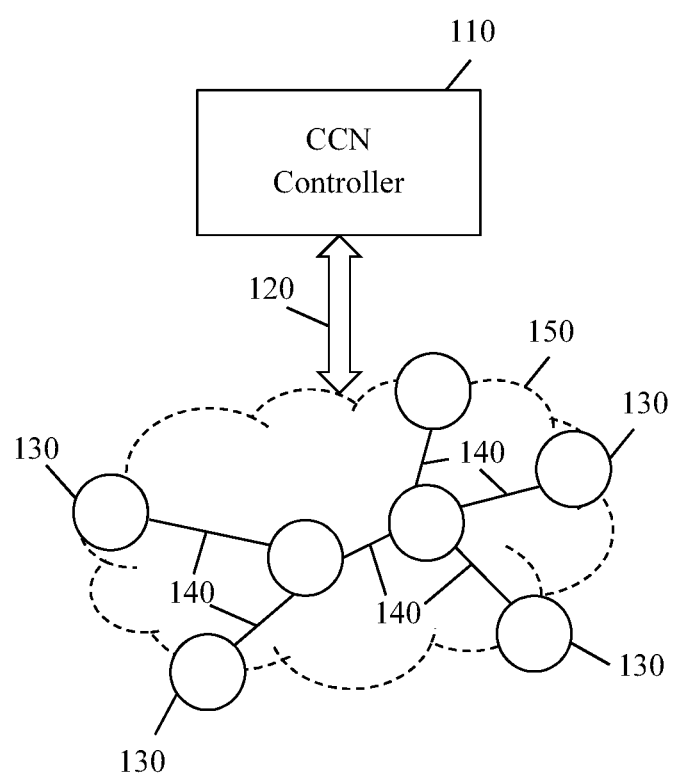
FIG. 1 is a schematic diagram of an embodiment of a CCN architecture.

FIG. 1 is a schematic diagram of an embodiment of a CCN architecture 100. The CCN architecture 100 comprises a CCN controller 110, and a CCN 150. The CCN 150 comprises a plurality of NEs acting as content nodes 130 and/or other NEs, such as content producers and/or content consumers, interconnected by a plurality of links 140. The CCN 150 provides in-network caching, built-in content security, and multi-cast data distributions according to the CCN protocol. The CCN 150 may comprise one or more networking domains that are operated by one or more administrative domains. The links 140 may comprise physical links, such as fiber optic links, electrical links, wireless links, and/or logical links used to transport data in the CCN 150.

The CCN controller 110 may be any device configured to manage and/or control the CCN 150. The CCN controller 110 may be physically or logically located within the CCN 150. In an embodiment, the CCN controller 110 may be a centralized logical entity distributed across one or more NEs. In another embodiment, the CCN controller 110 may be implemented as a network control module within a virtual machine (VM). The CCN controller 110 performs a variety of network control functions according to the application-specific objectives. Some examples of network control functions may include, but are not limited to, generating and maintaining network topologies, identifying application flows, and managing network resources and network state information.

To deliver content through the CCN 150, the CCN controller 110 generates flow rules by computing one or more forwarding paths through the CCN 150 and identifies controls based on any application, content, or domain specific objectives. Some examples of controls may include security verifications and enforcements, context adaptations, content caching, and policy enforcements. After identifying the flow rules, the CCN controller 110 generates a flow entry based on the flow rules and adds the flow entry in each of the content nodes 130 along the forwarding path, for example, by sending the flow entry in a flow configuration message via a network control interface 120. The network control interface 120 supports communication between the CCN controller 110 and the content nodes 130 and may employ a standard communication protocol and/or extend a current communication protocol, such as the OpenFlow protocol.

The CCN controller 110 builds and maintains a global network topology view of the CCN 150 based on the flow rules identified in the CCN 150, where the global network topology view is an abstracted view of the underlying infrastructure of the CCN 150. For example, the global network topology view may include network resources, (e.g., bandwidth usage, bandwidth availability, and/or latencies), network statistics, and/or application statistics in addition to network connectivity information (e.g., interconnecting NEs and/or links).

The content nodes 130 may be any physical devices, such as routers and/or network switches, or logical devices configured to perform switching functions in the CCN 150 as directed by the CCN controller 110. The switching functions include forwarding incoming interest packets based on entries in the FIB, applying flow rules to the incoming packets, measuring statistics, and monitoring context changes.

The content nodes 130 receive flow rules from the CCN controller 110, such as forwarding paths for content flow in the CCN 150. The content nodes 130 maintain and track the received flow paths in FIBs. Entries in the FIB comprises content name prefixes and corresponding outbound port(s) or coupled to a next hop within the CCN towards a corresponding content producer.

To obtain a particular content item, a content consumer creates an interest packet and sends the interest packet through the CCN 150. The content item may be identified using hierarchically structured names that represent relationships between the different content items within the CCN 150. These names comprise any number of components where each component identifies a portion of the namespace hierarchy. The interest packet comprises a content name for the particular content item. The interest packet is routed through the CCN by the content nodes 130 toward the producers of the requested content item based on the content name.

When a content node 130 within the CCN 150 receives an interest packet, the content node 130 determines where to forward interest packet by applying a longest name prefix matching (LPM) on the provided content name. This process is repeated at each content node 130 until the interest packet is delivered to the content producer or content repository (e.g., content node 130 carrying the requested content). When the interest packet reaches a node within the CCN 150 that has the requested content, a data packet comprising the content and the content name is built and returned back to the consumer through the CCN 150 along the same path traveled by the interest packet. This return path is based on state information set up by content nodes 130 that forwarded the corresponding interest packet. Both the interest and data packets may not carry any host or interface addresses.

The content nodes 130 within the CCN 150 keep both interests and data packets for a period of time. When a content node 130 receives multiple interest packets for the same content, the content node 130 forwards only the first interest packet received towards the content producer. The content node 130 stores information of the received interest packets in a PIT for a defined period of time or until a corresponding data packet is received. An entry in the PIT comprises the requested content name and the interest packet origin (e.g., the previous hop). When the content node 130 receives a data packet, the content node 130 forwards the data packet based on all active PIT entries for the received content. The PIT entries are removed once satisfied and the content node 130 caches the received content in a CS. The content node 130 may employ the content cached in the CS to satisfy any received interest packet without forwarding the interest packet.

As described above, CCNs, such as the CCN 150, identify entities by hierarchical names or name prefixes (e.g., /domain/host/content) and rely on stateful name-based forwarding to pull content from the content producer. In addition, content nodes, such as the content nodes 130, in the CCNs employ PITs to store interest packet information, FIBs to store outgoing interface information, and content stores (CSs) to cache contents, where the PITs, the FIBs, and the CSs also store associated content names. However, the hierarchical names are unbounded names, which may carry any number of name components and each name component may comprise any number of characters. The unbounded names may lead to large transmission overheads and consuming bandwidth unnecessarily. In addition, the unbounded names may lead to large storage requirements at the content nodes for the PITs, the FIBs, and the CSs. Further, the searching of the PITs, the FIBs, and the CSs based on the unbounded content names may be inefficient. For example, the PITs, the FIBs, and the CSs may be indexed by hashes of the content names. Thus, hash computations are required for performing the search, where hash computations may be expensive.

Disclosed herein are various embodiments for efficiently performing hash-based forwarding in a CCN by transforming content names from a namespace to a hash-space to produce hash-based content IDs. A namespace content name comprises an unbounded length of character string, whereas a hash-based content ID is composed of hash values, which are bounded in length and may comprise a significantly shorter average length. In a hash-based forwarding CCN, interest packets are embedded with hash values identifying requested contents and data packets are embedded with hash values identifying the contents in the data packets. The disclosed embodiments employ one or more NRServs to compute hashes for content names in the CCN. The disclosed embodiments enable end hosts (e.g., producers and consumers) of the CCN to publish and/or request contents based on content names by employing edge routers to translate packets between name-space and hash-space. The edge routers that are connected to the end hosts are referred to as ingress points or service points. For example, a service point may obtain mappings between content names and hash-based content IDs from the NRServs and store the mappings in a local database. Upon receiving a packet carrying a hash-based content ID from the CCN, the service point replaces the hash-based content ID in the received packet with a corresponding content name according to the local database prior to forwarding the packet to an end host. Conversely, upon receiving a packet carrying a content name from an end host, the service point replaces the content name in the received packet with a corresponding hash-based content ID according to the local database prior to forwarding the packet in the CCN. In an embodiment, content names are transformed into hash-based content IDs by applying a hash function, such as a cryptographic hash function, to each name prefix of the content name and aggregating the hashes of the name prefixes. Thus, the CCN hierarchical name structure is preserved in the hash-based content IDs. In addition, FIB searches may be performed based on LPMs as in the name-based forwarding scheme.

Some advantages of employing hash-based forwarding over name-based forwarding may include efficient utilization of resources and elimination of hashing overheads at content routers. The hash-based forwarding scheme enables content nodes to store PITs, FIBs, and CSs based on bounded-length hash-based content IDs instead of unbounded-length name-base content IDs or content names, and thus reduces storage requirements at the content nodes. In addition, transmission overhead for packets carrying the shorter-length hash-based content IDs is smaller than packets carrying the unbounded-length content names. Further, the hash-based content IDs carried in the packets may be employed to directly index into the PITs, the FIBs, and the CSs during table lookups instead of computing hashes for the table lookups as in the name-based forwarding scheme, and thus reducing processing overhead at the content nodes and improving table lookup performance. Although the present disclosure described the embodiments based on end hosts that operate on content names, the disclosed embodiments are suitable for any end host formats since the conversion of content ID format is performed by the edge routers.

Figure 2:
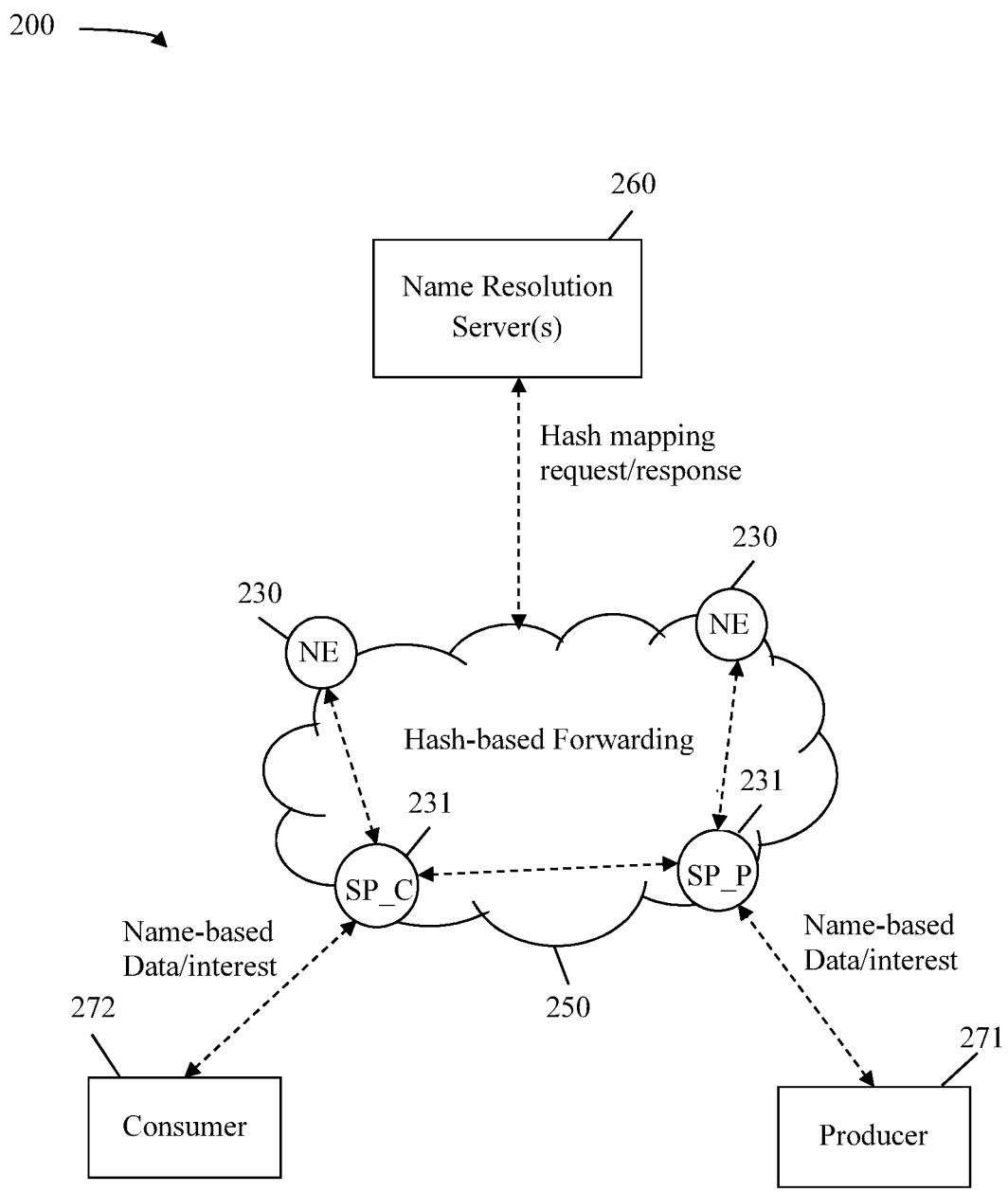
FIG. 2 is a schematic diagram of an embodiment of a hash-based forwarding CCN architecture.

FIG. 2 is a schematic diagram of an embodiment of a hash-based forwarding CCN architecture 200. The CCN architecture 200 comprises a CCN 250 and one or more NRServs 260. The CCN 250 is structurally similar to the CCN 150, but transports packets carrying hash representations of content names instead of the content names as in the CCN 150. Hash representations of content names refer to the hash values generated from the content names based on a hash function. The hash representation of a content name is referred to as a hash-based content ID. As shown, the CCN 250 comprises a plurality of NEs 230 and a plurality of service points 231, shown as SP_P and SP_PC. The NEs 230 are similar to the content nodes 130, but performs packet forwarding based on hash-based content IDs. In addition, the NEs 230 stores and indexes PITs, FIBs, and CSs based on the hash-based content IDs, where the storage structures and indexing schemes of the PITs, FIBs, and CSs are discussed more fully below. The service points 231 are similar to the NEs 230, but may act as ingress points for one or more producers 271 and/or consumers 272. As shown, the service point SP_PC 231 serves a consumer 272, and the service point SP_PP 231 serves a producer 271.

The NRServs 260 may be any physical devices or VMs configured to transform content names to hash-based content IDs. For example, the NRServs 260 may employ a 64-bit cryptographic hash function, which may provide additional security protection. The NRServs 260 maintain and track mappings between the hash-based content IDs and the content names in a local database. For example, upon receiving a content name registration request from a producer 271, the NRSery 260 generates a hash-based content ID for the requested content name, stores a mapping between the content name and the hash-based content ID in the local database, and responds with the generated hash-based content ID and/or the mapping. Subsequently, the NRsery 260 may receive a hash mapping request for the content name from a service points 231. In response, the NRsery 260 may provide a corresponding hash-based ID based on the mapping stored in the local database. In some embodiments, each NRSery 260 serves a subset of the NEs 230 and the service points 231 in the CCN 250. In such embodiments, the NRServs 260 employ a global hash function and may coordinate with each other to provide mappings between hash-based content IDs and content names. In some other embodiments, a single NRSery 260 may serve all NEs 230 and service points 231 in the CCN 250. In yet some other embodiments, the CCN 250 may be divided into multiple domains. In such embodiments, each domain may employ one or more NRServs 260 and may employ a different hash function.

To transform a content name, a hash function is applied to each name prefix of the content name and the hash values of the name prefixes are concatenated to form a hash-based content ID with the same hierarchical structure as the content name. For example, a content name represented by/domain/host/content comprises three name components and three name prefix levels. The three name components are /domain, /host, and /content. The three name prefixes are /domain, /domain/host, and /domain/host/content. The name prefix, /domain, is referred to as a first level name prefix or a minimum length name prefix. The name prefix, /domain/host/content, is referred to as a last level name prefix or a maximum length name prefix In some embodiments, the NRSery 260 may shorten the computed hash values for one or more of the name prefixes by extracting a portion of the computed hash values. The details of name-to-hash transformations are described more fully below.

The producer 271 may be a physical device, a VM, or an application that executes on a VM or a physical device configured to produce and publish contents in the CCN 200 based on content names. The consumer 272 may be a physical device, a VM, or an application that executes on a VM or a physical device configured to consume contents in the CCN 250 based on content names. In order to enable the producer 271 and the consumer 272 to operate based on content name, the service points 231 translates packets between content names and hash-based content IDs. For example, upon receiving a packet carrying a content name from the producer 271 or the consumer 272, the service point 231 replaces the content name in the received packet with a corresponding hash-based content ID prior to forwarding the packet in the CCN 250. Conversely, upon receiving a packet carrying a hash-based content ID from the CCN 250, the service point 231 replaces the hash-based content ID in the received packet with a corresponding content name prior to forwarding the packet to the consumer 272 or the producer 271. It should be noted that the computationally expensive hash computations are typically not performed at the service points 231 as the service points 231 consult with the NRservs 260 to obtain mappings between hash-based content IDs and content names. The service points 231 may store the name-to-hash mappings received from the NRservs 260 in local databases for fast lookups. In one embodiment, service points may be allowed to perform hash-based mappings based on locally existing information on the namespaces.

Figure 3:
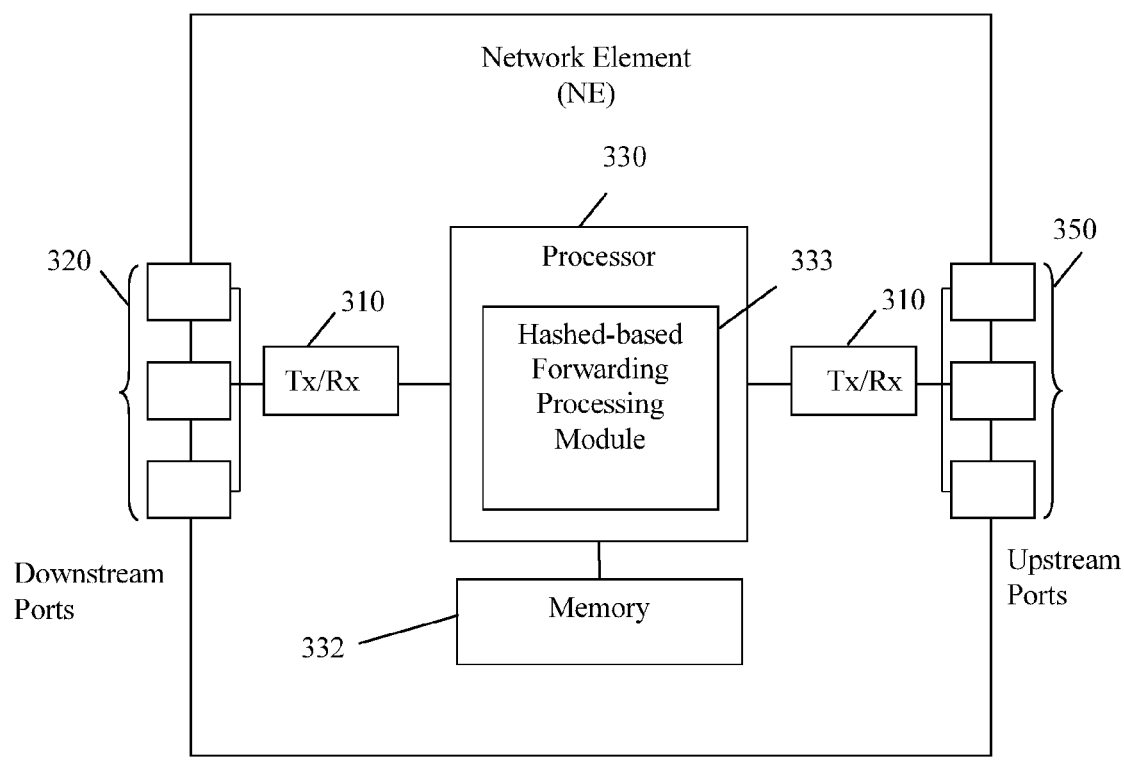
FIG. 3 is a schematic diagram of an embodiment of an NE within a CCN.

FIG. 3 is a schematic diagram of an embodiment of an NE 300 within a CCN, such as the CCN 250. The NE 300 may be any component configured to act as a node such as the NRServs 260, the CCN controller 110, the NEs 130 and 230, the service points 231, the producer 271, and the consumer 272. NE 300 may be configured to implement and/or support the hash-based forwarding, storage, search mechanisms, or any other schemes described herein. NE 300 may be implemented in a single node or the functionality of NE 300 may be implemented in a plurality of nodes. One skilled in the art will recognize that the term NE encompasses a broad range of devices of which NE 300 is merely an example NE 300 is included for purposes of clarity of discussion, but is in no way meant to limit the application of the present disclosure to a particular NE embodiment or class of NE embodiments.

At least some of the features/methods described in the disclosure are implemented in a network apparatus or component such as an NE 300. For instance, the features/methods in the disclosure may be implemented using hardware, firmware, and/or software installed to run on hardware. The NE 300 is any device that transports packets through a network, e.g., a switch, router, bridge, server, a client, etc.

As shown in FIG. 3, the NE 300 may comprise transceivers (Tx/Rx) 310, which may be transmitters, receivers, or combinations thereof. A Tx/Rx 310 may be coupled to plurality of downstream ports 320 for transmitting and/or receiving frames from other nodes and a Tx/Rx 310 may be coupled to plurality of upstream ports 350 for transmitting and/or receiving frames from other nodes, correspondingly. Upstream refers to the transmission direction towards a content source, whereas downstream refers to the transmission direction towards a content consumer.

A processor 330 may be coupled to each Tx/Rx 310 to process the frames and/or determine which nodes to send the frames to. The processor 330 may comprise one or more multi-core processors and/or memory devices 332, which may function as data stores, buffers, etc. The processor 330 may be implemented as a general processor or may be part of one or more application specific integrated circuits (ASICs) and/or digital signal processors (DSPs). The processor 330 may comprise a hash-based forwarding processing module 333, which may perform processing functions of a content node, an NRServ, a serve point depending on the embodiments and may implement methods 400, 800, and 900, as discussed more fully below, and/or any other flowcharts, schemes, and methods discussed herein. As such, the inclusion of the hash-based forwarding processing module 333 and associated methods and systems provide improvements to the functionality of the NE 300. Further, the hash-based forwarding processing module 333 effects a transformation of a particular article (e.g., the network) to a different state. In an alternative embodiment, the hash-based forwarding processing module 333 may be implemented as instructions stored in the memory devices 332, which may be executed by the processor 330. The memory device 332 may comprise a cache for temporarily storing content, e.g., a random-access memory (RAM). Additionally, the memory device 332 may comprise a long-term storage for storing content relatively longer, e.g., a read-only memory (ROM). For instance, the cache and the long-term storage may include dynamic RAMs (DRAMs), solid-state drives (SSDs), hard disks, or combinations thereof. The memory device 332 may be configured to store one or more FIBs, PITs, CSs, and name-to-hash databases.

It is understood that by programming and/or loading executable instructions onto the NE 300, at least one of the processor 330 and/or memory device 332 are changed, transforming the NE 300 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable and that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

Figure 4:
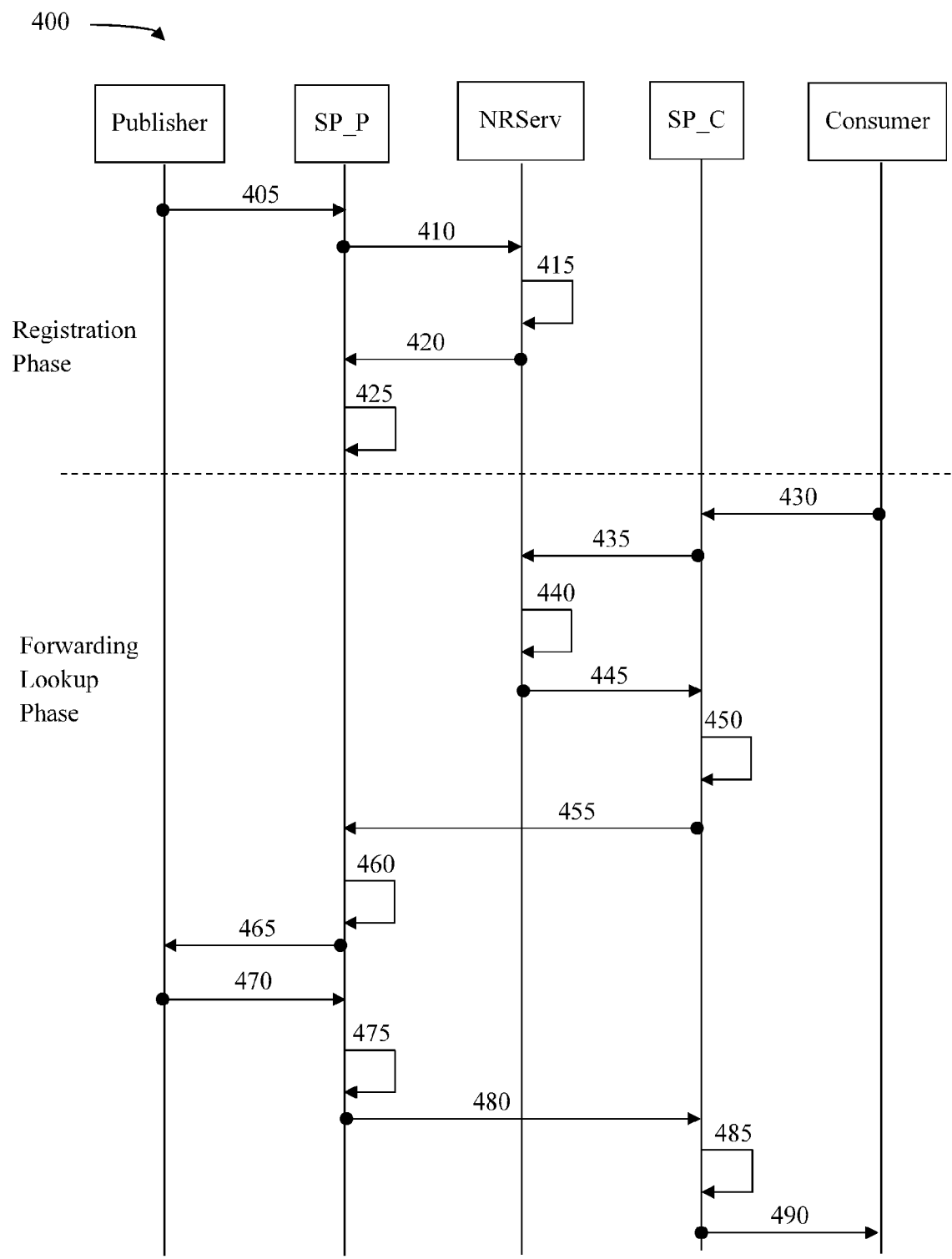
FIG. 4 is a protocol diagram of an embodiment of a method for performing hash-based forwarding in a CCN.

FIG. 4 is a protocol diagram of an embodiment of a method 400 for performing hash-based forwarding in a CCN, such as the CCN 250. The method 400 is implemented between a producer, such as the producer 271, a consumer, such as the consumer 272, a NRserv, such as the NRSery 260, a service point, shown as SP_P, such as the service point SP_P 231, that serves the producer, and a service point, shown as SP_C, such as the service point SP_PC 231, that serves the consumer. For example, the NRserv, the SP_P, and the SP_C, each employs a local database to store and track mappings between content names and hash-based content IDs. The method 400 is implemented when the producer publishes content and the consumer consumes the content. The method 400 illustrates a registration phase when the producer publishes the content and a forwarding lookup phase when the consumer pulls the content from the CCN. The method 400 assumes that the content is not cached when the consumer requests the content. In addition, the method 400 assumes that the SP_P and the SP_PC employs the same NRServ.

At step 405, the producer sends a content registration request to the SP_P requesting registration of a content name in the CCN. The content name identifies a content produced by the producer. At step 410, the SP_PP forwards the content registration request to the NRServ. At step 415, upon receiving the content registration request, the NRSery generates a hash-based content ID for the content name by applying a hash function to the content name, as discussed more fully below. After generating the hash-based content ID, the NRSery stores a mapping between the content name and the hash-based content ID in the NRServ's local database. In some embodiments, the NRSery may apply more than one hash functions to a given namespace (e.g., the content name) and may store the hash functions associated with the given namespace in association with the mapping. At step 420, the NRSery sends a content registration response to the SP_P indicating the content name and the generated hash-based content ID, In one embodiment, NRSery may also send the associated hash functions together with the content name and the generated hash-based content ID. At step 425, upon receiving the content registration response, the SP_P generates an entry in the SP_PP's local database to store a mapping between the content name and the hash-based content ID in the received content registration response. At this time, the content name is registered in the CCN and the consumer may request for the content.

At step 430, the consumer sends an initial name-based interest packet to the SP_PC indicating a requested content name. At step 435, upon receiving the initial name-based interest packet, the SP_PC sends a hash mapping request to the NRSery indicating the requested content name. In some embodiments, the SP_PC may first check the SP_PC's local database for an entry matching the requested content name and sends the hash mapping request when a match is not found.

At step 440, upon receiving the hash mapping request, the NRSery searches for an entry in the NRServ's local database with a content name matching the requested content name. At step 445, when a match is found, the NRSery sends the hash-based content ID in the matching entry to the SP_PC. In some embodiment, when the SP_P and the SP_PC are served by different NRserv, a match may not be found. Thus, the NRSery may communicate with other NRServs in the CCN to obtain the hash-based content ID for the requested content name.

At step 450, after receiving the hash-based content ID, the SP_PC replaces the requested content name in the initial name-based interest with the received hash-based content ID to produce a hash-based interest packet. At step 455, the SP_PC forwards the hash-based interest packet carrying the hash-based content ID to the SP_PP.

At step 460, upon receiving the hash-based interest packet carrying the hash-based content ID, the SP_PP performs a reverse look up to search for an entry in the SP_PP's local database with a content name matching the hash-based content ID in the received hash-based interest packet. After finding a match, the SP_PP replaces the hash-based content ID in the received hash-based interest packet with the content name in the matching entry to produce a translated name-based interest packet. At step 465, the SP_PP sends the translated name-based interest packet to the producer indicating the requested content by the content name. At step 470, in response to the translated name-base interest packet, the producer sends an initial name-based data packet carrying the requested content identified by the content name.

At step 475, upon receiving the initial name-based data packet, the SP_P searches for an entry in the SP_P's local database with a content name matching the content name in the initial name-based data packet. After finding a match, the SP_P replaces the content name in the received initial name-based data with the hash-based content ID in the matching entry to produce a hash-based data packet. At step 480, in response to the hash-based interest packet, the SP_P sends the hash-based data packet to the SP_C.

At step 485, upon receiving the hash-based data packet, the SP_C searches for an entry in the SP_C's local database with a hash-based content ID matching the hash-based content ID in the hash-based data packet. After finding a match, the SP_C replaces the hash-based content ID in the received hash-based data with the content name in the matching entry to produce a translated name-based data packet. At step 490, the SP_C sends the translated name-based data packet to the consumer.

Figure 5:
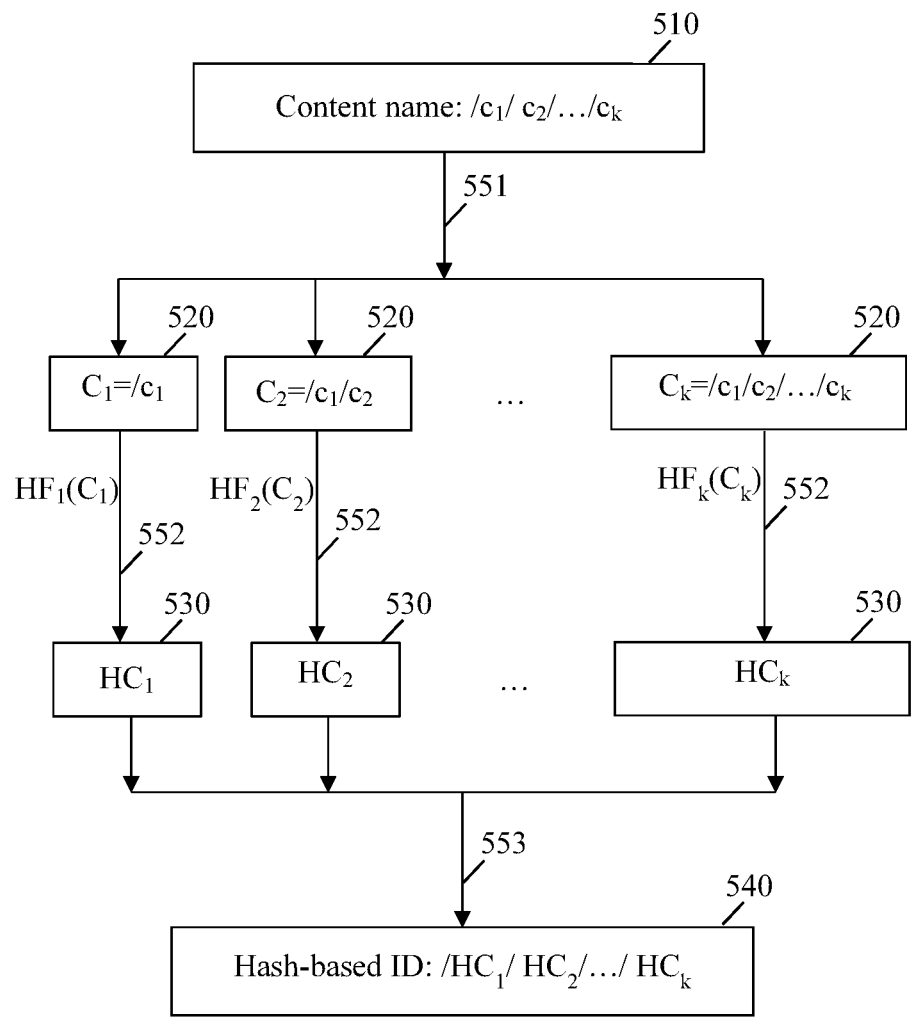
FIG. 5 is a schematic diagram of an embodiment of a scheme for transforming a content name to a hash-based content ID.

FIG. 5 is a schematic diagram of an embodiment of a scheme 500 for transforming a content name to a hash-based content ID. The scheme 500 is employed by an NRServ, such as the NRServs 260, when the NRSery receives a content registration request from a producer indicating a content name 510. The content name 510 comprises a sequential concatenation of k plurality of name components, shown as /$c_i$/, where k is a positive integer and i is a value varying from 1 to k. For example, for a content name represented by /domain/host/content, id corresponds to /domain, /c2 corresponds to /host, and /c3 corresponds to /content. At step 551, the content names are divided into k plurality of name prefixes 520, shown as $C_i$. For example, the content name /domain/host/content may be divided into three name prefixes 520, a level one name prefix $C_1$ 520 corresponding to /domain, a level two name prefix $C_2$ 520 corresponding to /domain/host, and a level three name prefix $C_3$ 520 corresponding to /domain/host/content. At step 552, a hash function, shown as $HF_t(C_i)$, is applied to each level name prefix, $C_i$, to produce a hash component 530, shown as $HC_i$, which is a hash value. The hash component 530, $HC_i$, may be referred to as a level i hash component. The hash function, $HF_i$, may be a cryptographic hash function or any suitable hash function. At step 553, the hash components 530 are concatenated in the same sequential order as the name prefixes 520 of the content name 510 to form a hash-based content ID 540, shown as $/HC_1/HC_2/\ldots/HC_k$, which comprises the same hierarchical structure as the content name 510.

In one embodiment, the hash function, $HF_i$, is a 64-bit hash function when i is equal to 1 and a 32-bit hash function when i is a value between 2 to k. In such an embodiment, $HC_1$ is set to the full 64-bit hash value generated from $HF_1$, and for $2 \leq i \leq k$, $HC_1$ is set to the full 32-bit hash value generated from $HF_i$. In a second embodiment, the hash function $HF_i$ is a 32-bit hash function for all values of i between 1 to k. In such an embodiment, $HC_i$ is set to the full 32-bit hash value generated from $HF_i$ for all values of i between 1 to k. In a third embodiment, the hash function $HF_i$ is a 64-bit hash function for all values of i between 1 to k. In such an embodiment, $HC_1$ is set to the full 64-bit hash value generated from $HF_1$, whereas for $2 \leq i \leq k$, $HC_i$ is set to a shortened version (e.g., a 32-bit portion) of the 64-bit hash value generated from $HF_i$.

Figure 6:
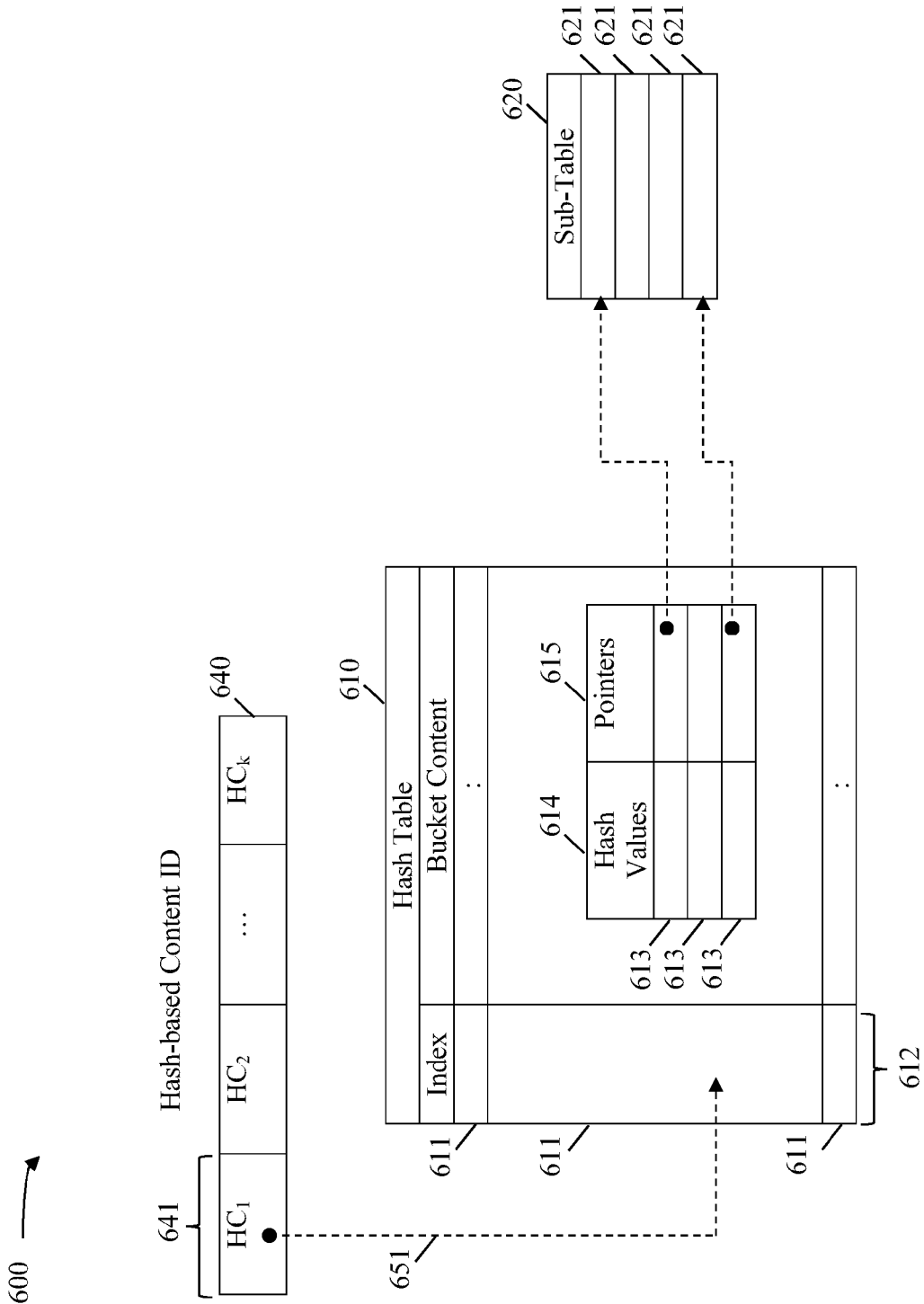
FIG. 6 is a schematic diagram of an embodiment of a scheme for storing and searching a hash-based forwarding table.

FIG. 6 is a schematic diagram of an embodiment of a scheme 600 for storing and searching a hash-based forwarding table 610, such as a PIT, a FIB, or a CS. The scheme 600 is employed by a content node, such as the NEs 230 and the service points 231, in a CCN, such as the CCN 250. The table 610 may represent a PIT, a FIB, or a CS stored at the content node, for example, in a memory device, such as the memory device 332. The scheme 600 assumes the employment of a 64-bit hash function for name-to-hash conversion. However, the scheme 600 may be employed with any hash function. The table 610 comprises a plurality of bucket entries 611. Each bucket entry 611 comprises an index 612, which is a hash value associated with a content name. For example, the index 612 is a first 32-bit portion of a 64-bit level one hash component $HC_1$, such as the hash component 530, of a hash-based content ID, such as the hash-based content ID 540. Each bucket entry 611 further comprises a plurality of bucket sub-entries 613 comprising a 32-bit hash value 614 and a pointer 615. The 32-bit hash value 614 is a second 32-bit portion of the 64-bit level one hash component, $HC_i$. The pointer 615 references a sub-table entry 621 of a sub-table 620. In an embodiment, when $HC_1$ is generated from a 32-bit hash function, the index 612 is set to $HC_1$ and the 32-bit hash value 614 is set to a transformation value, represented by $HC_1^*$, by applying a transform function to $HC_1$, to produced $HC_1^*$. In another embodiment, the 32-bit hash value 614 may be a combination of a number of hash components of the hash-based content ID, as described more fully below.

The sub-table 620 comprises information associated with the hash component, $HC_1$, or references to the information. When the table 610 represents a PIT, the sub-table 620 is associated with pending interest packets. For example, each sub-table entry 621 may comprise a full hash-based content ID of a pending interest packet, a nonce, an incoming interface (e.g., inbound port), and a timeout value. The full hash-based content ID refers to the aggregation of all hash components of a corresponding content name. When the table 610 represents a FIB, the sub-table 620 is associated with forwarding information. For example, each sub-table entry 621 may comprise a full hash-based content ID and corresponding outgoing interface information (e.g., outbound ports). When the table 610 represents a CS, each sub-table entry 621 stores a full hash-based content ID and a reference to corresponding content data. It should be noted that the bucket entries 611, the sub-entries 611 in the bucket entries 611, and the sub-table 620 may be configured as shown and described or alternatively configured as determined by a person of ordinary skill in the art to achieve similar functionalities. For example, content nodes, such as the NEs 230 and the service points 231 may independently organize the storages (e.g., with multiple level of sub-tables) for PITs, FIBs, and CSs and index the PITs, FIBs, and CSs by at least some portion of the level one hash component 641, $HC_1$.

A table lookup in the table 610 is based on 64-bit hash matching. For example, upon receiving a packet embedded with a hash-based content ID 640 from the CCN, a 32-bit portion of the level one hash component 641, $HC_1$, in the hash-based content ID 640 is directly employed to index into the table 610 to locate a bucket entry 611, as shown by the dashed arrow 651. The other 32-bit portion of $HC_1$ is employed to select a bucket sub-entry 613 in the located bucket entry 611. Subsequently, the hash-based content ID 640 in the received packet is compared to the hash-based content ID in a sub-table entry 621 referenced by the selected bucket sub-entry 613 to determine a match. The structure of the table 610 may also be suitable for LPM in FIBs, as described more fully below.

Figure 7:
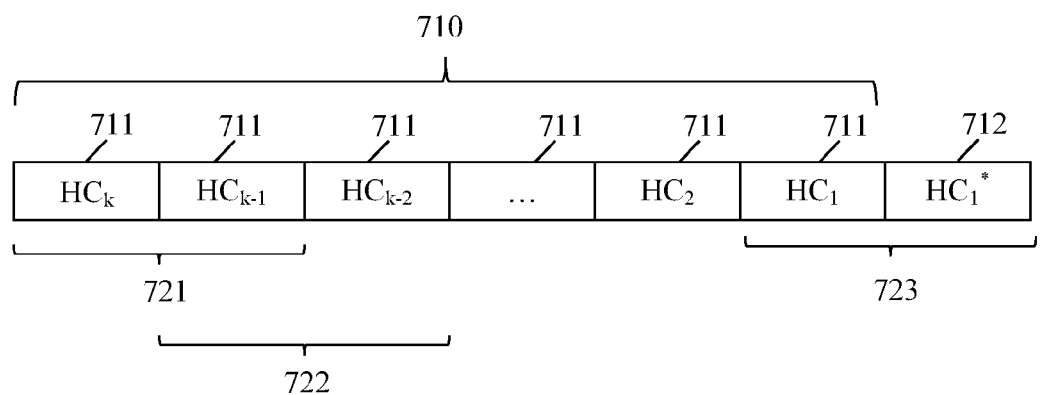
FIG. 7 is a schematic diagram of an embodiment of a scheme for extracting content name information from a hash-based content ID

FIG. 7 is a schematic diagram of an embodiment of a scheme 700 for extracting content name information from a hash-based content ID 710 similar to the hash-based content IDs 540 and 640. The scheme 700 is employed by a content node, such as the NEs 230 and the service points 231, in a CCN, such as the CCN 250, to perform LPM for FIB lookup. As shown, a hash-based content ID 710 comprises k plurality of hash components 711, shown as $HC_1$ to $HC_k$, and an additional hash component 712, shown as $HC_1^*$. The hash components 711 are similar to the hash components 530. The additional hash component $HC_1^*$ 712 is a transformation of the hash component $HC_1$ 711. The additional hash component $HC_1^*$ 712 may be employed for sub-entry lookup or LPM when the hash component $HC_1$ 711 is a 32-bit hash value. An LPM may be performed by merging two consecutive hash components 711 and 712. For example, a first LPM check may concatenate the hash components $HC_k$ and $HC_{k-1}$ 711, shown as 721, to obtain a hash value for searching a FIB, which may comprise a structure similar to the hash table 610 and the sub-table 620. The hash value may be compared against a hash value, such as the hash value 614, in a FIB entry, such as the entry 613. If no match is found from the first LPM check, a second LPM check may employ a concatenation of the hash components $HC_{k-1}$ and $HC_{k-2}$ 711, shown as 722. If no match is found, the search may continue, where a last LPM may employ a concatenation of the hash component $HC_1$ 711 and the additional hash component $HC_1^*$ 712, shown as 723.

Figure 8:
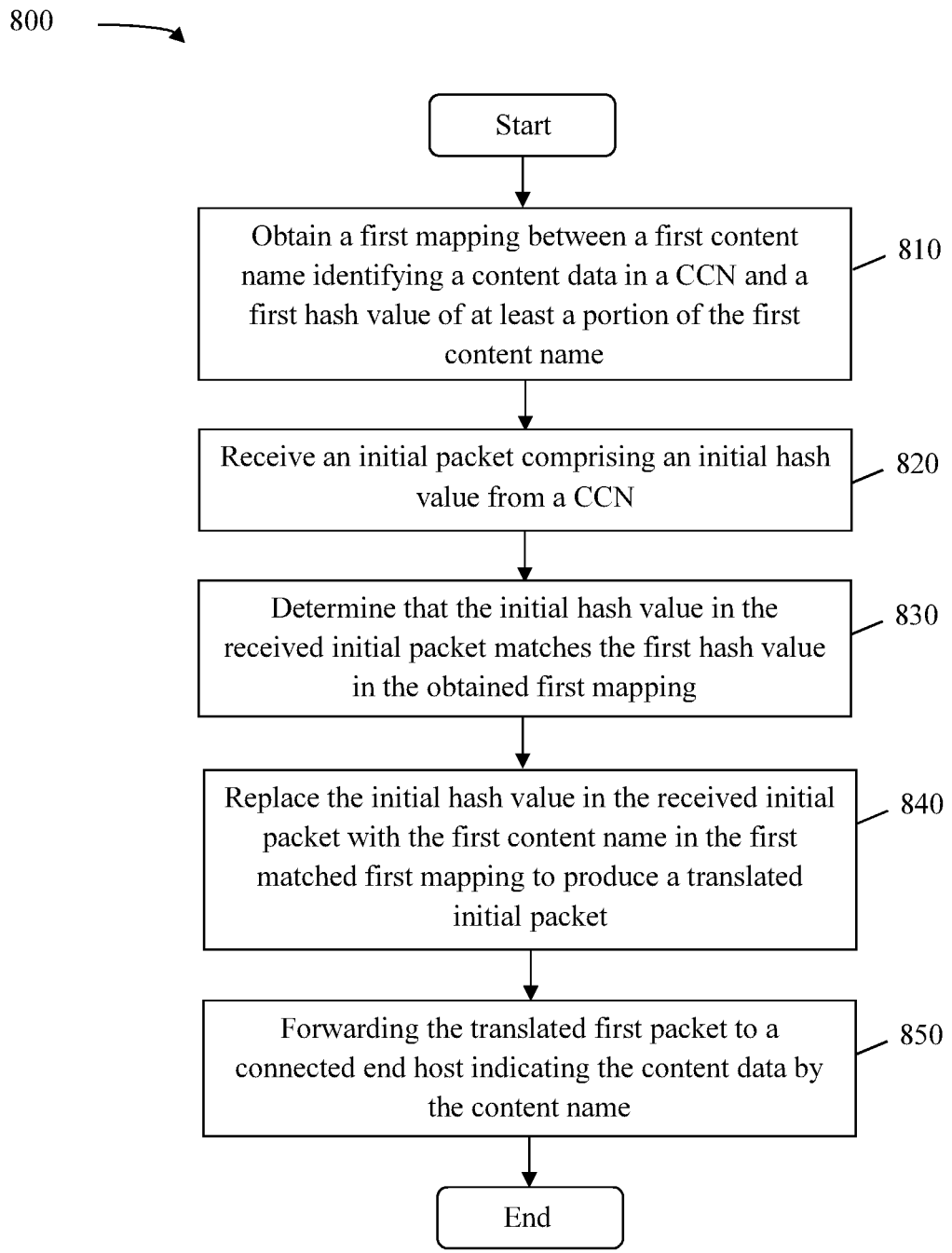
FIG. 8 is a flowchart of an embodiment of a method for performing hash-based forwarding.

FIG. 8 is a flowchart of an embodiment of a method 800 for performing hash-based forwarding. The method 800 is implemented by a service point, such as the service point 231 and the NE 200, in a hash-based forwarding CCN, such as the CCN 250. The method 800 employs similar mechanisms as the method 400. The method 800 is implemented when the service point forwards packets from a connected host the CCN. The connected host may be a producer, such as the producer 271, that produces content in the CCN or a consumer, such as the consumer 272, that consumes content in the CCN. The connected end host identifies content by content names, such as the content name 510, in a hierarchical structured namespace, whereas routers, such as the NEs 230, in the CCN routes packets by hash-based content IDs, such as the hash-based content IDs 540, 640, and 719. At step 810, a mapping between a first content name identifying a content data in the CCN and a first hash value of at least a portion of the first content name is obtained. For example, the first content name comprises a character string in the hierarchical structured namespace. The first hash value may correspond to one of the hash components, such as the hash components 530, in a hash-based content ID corresponding to the content name. In one embodiment, the service point requests the mapping from an NRServ, such as the NRSery 260. In another embodiment, the service point performs the mapping locally when the service point has previously received a mapping and/or a corresponding hash function associated with the first content name. For example, a producer may share a set of content names with a consumer. In order to avoid overloading the NRSery and reduce access latency, the NRSery may provide the service point with a hash function associated with the producer. Upon receiving a request from the consumer indicating one of the content names provided by the producer, the service point may compute a mapping for the content name locally according to the hash function.

At step 820, an initial packet comprising an initial hash value is received from the CCN. At step 830, a determination is made that the initial hash value in the received initial packet matches the first hash value in the obtained first mapping. At step 840, the initial hash value in the received initial packet is replaced with the first content name in the first obtained first mapping to produce a translated initial packet. At step 850, the translated first packet is forwarded to the connected end host indicating the content data by the content name.

In an embodiment, the connected end host is a producer of the content data and the received initial packet is an interest packet requesting for the content data. In such an embodiment, the first mapping between the first hash value and the first content name may be obtained from a content registration procedure initiated by the producer as described in the registration phase in scheme 400. The service point may store the first mapping in a local database. In another embodiment, the connected end host is a consumer and the received initial packet is a data packet carrying the content data as described in the forwarding lookup phase in scheme 400. In such an embodiment, upon receiving the initial packet, the service point may first check a local database for a match and send a hash mapping request to the NRsery when no match is found.

Figure 9:
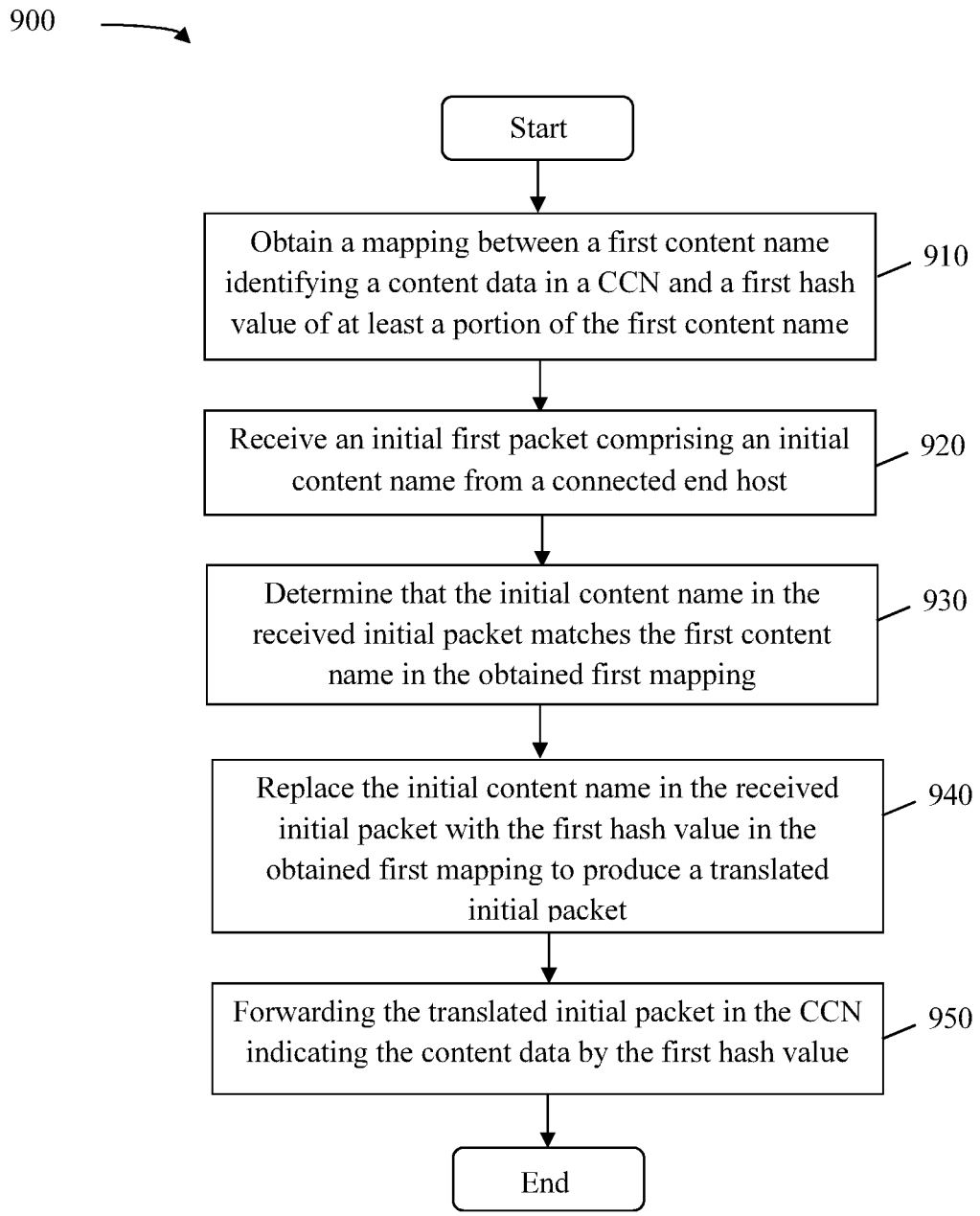
FIG. 9 is a flowchart of another embodiment of a method for performing hash-based forwarding.

FIG. 9 is a flowchart of another embodiment of a method 900 for performing hash-based forwarding. The method 900 is implemented by a service point, such as the service point 231 and the NE 200, in a hash-based forwarding CCN, such as the CCN 250. The method 900 employs similar mechanisms as the method 400. The method 900 is implemented when the service point forwards packets from the CCN to a connected end host. The connected end host may be a producer, such as the producer 271, that produces content in the CCN or a consumer, such as the consumer 272, that consumes content in the CCN. The connected end host identifies content by content names, such as the content name 510, in a hierarchical structured namespace, whereas routers, such as the NEs 230, in the CCN routes packets by hash-based content IDs, such as the hash-based content IDs 540, 640, and 710. At step 910, a mapping between a first content name identifying a content data in the CCN and a first hash value of at least a portion of the first content name is obtained, for example, from an NRServ, such as the NRSery 260. For example, the content name comprises a character string in the hierarchical structured namespace. The first hash value may correspond to one of the hash components, such as the hash components 530, in a hash-based content ID corresponding to the content name. At step 920, an initial packet comprising an initial content name is received from the connected end host. At step 930, a determination is made that the initial content name in the received initial packet matches the first content name in the obtained first mapping. At step 940, the initial content name in the received initial packet is replaced with the first hash value in the obtained first mapping to produce a translated initial packet. At step 950, the translated initial packet is forwarded in the CCN indicating the content data by the first hash value. In an embodiment, the connected end host is a producer of the content data and the received initial packet is a data packet carrying the content data. In another embodiment, the connected end host is a consumer and the received initial packet is an interest packet requesting for the content data.

FIG. 10 is a table 1000 comparing average PIT and FIB storage requirements of various storage schemes. The table 1000 compares average per PIT entry and per FIB entry storage requirements of a name-based storage scheme at a content node such as the content nodes 130 and a hash-based forwarding storage scheme at a content node such as the NEs 230 and the service points 231. The name-based forwarding content nodes store content names, such as the content name 510, in FIBs and PITs. The hash-based forwarding content node stores hash-based content IDs, such as the hash-based content IDs 540 and 640, in FIBs and PITs comprising a similar storage structure as the hash table 610 and the sub-table 620. The table 1000 compares the average per PIT entry and per FIB entry storage requirement when the interest packet size is about 60 bytes, about 80 bytes, and about 100 bytes. The table 1000 is generated based on numerical analysis assuming an average name component size of about 9 bytes. As shown, the per PIT and per FIB entry storage requirements at a hash-based forwarding content node is about 20 percent (%) less than a name-based forwarding content node. As such, the disclosed hash-based forwarding scheme reduces storage requirements at content nodes.

Figure 11:
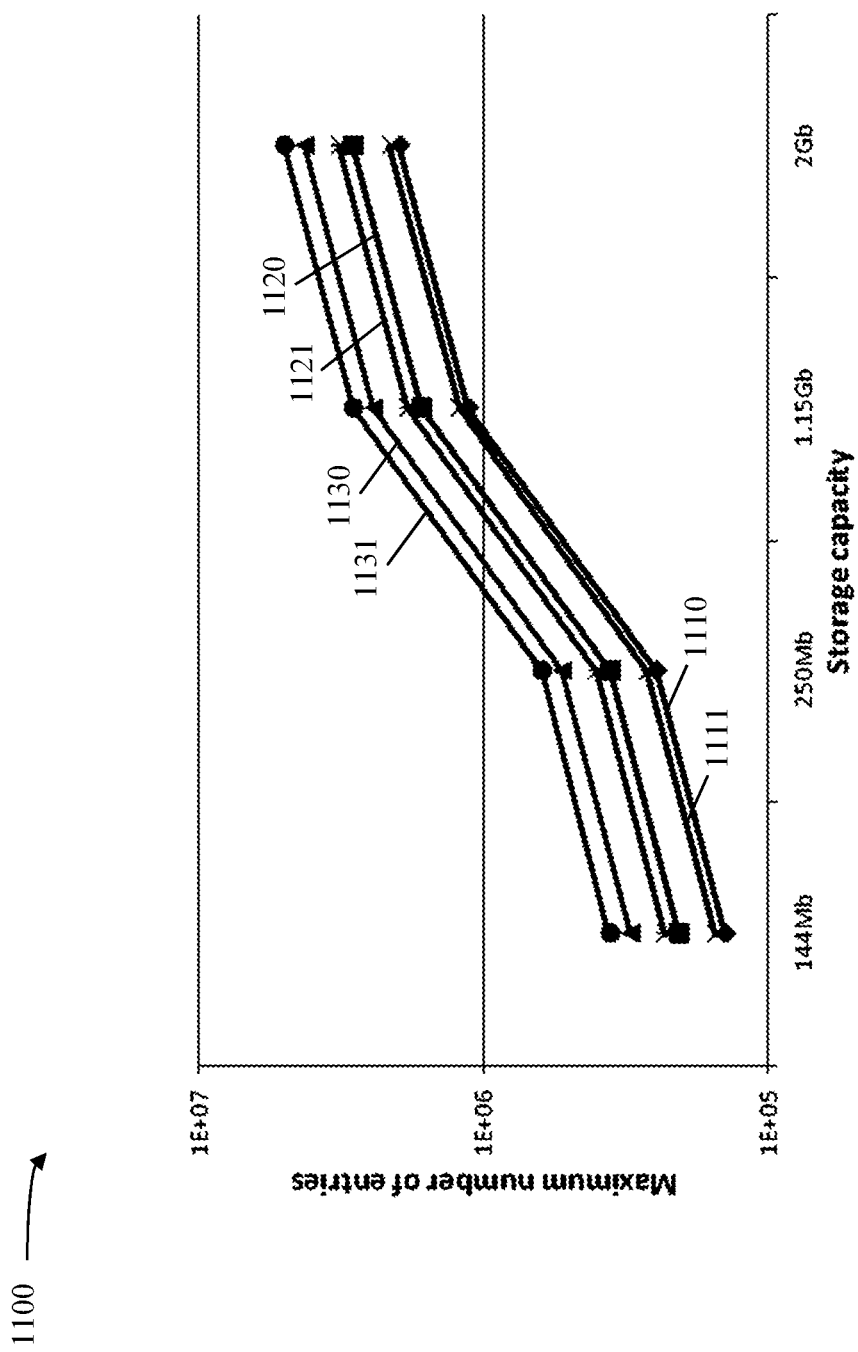
FIG. 11 is a graph comparing PIT and FIB storage performance of various storage schemes.

FIG. 11 is a graph 1100 comparing PIT and FIB storage performance of various storage schemes. In the graph 1100, the x-axis represents storage capacities in units of megabytes (Mb), and the y-axis represents maximum number of entries in a linear logarithmic scale. The graph 1100 compares storage performance between a name-based storage scheme, a hash-based storage scheme, and an optimized hash-based storage scheme that limits hash-based content IDs, such as the hash-based content IDs 540, 640, and 710, to a constant length, for example, about 128 bits. The name-based storage scheme is employed by a name-based forwarding content node, such as the content nodes 130. The hash-based storage and the optimized hash-based storage scheme are employed by a hash-based forwarding node, such as the NEs 230 and the service point 231. The graph 1100 is generated from numerical analysis assuming the employment of a fixed memory type, such as SRAM, for all storage schemes. The plots 1110 and 1111 show the maximum number of PIT and FIB entries supported as a function of memory size for the name-based storage scheme, respectively. The plots 1120 and 1121 show the maximum number of PIT and FIB entries supported as a function of memory size for the hash-based storage scheme, respectively. The plots 1130 and 1131 show the maximum number of PIT and FIB entries supported as a function of memory size for the optimized hash-based storage scheme. As shown, the PIT and FIB storage performances of the hash-based storage scheme and the optimized hash-based storage scheme are higher than the name-based storage scheme. As such, the disclosed hash-based forwarding scheme improves storage performance at content nodes such as the NEs 230 and the service points 231.

Figure 12:
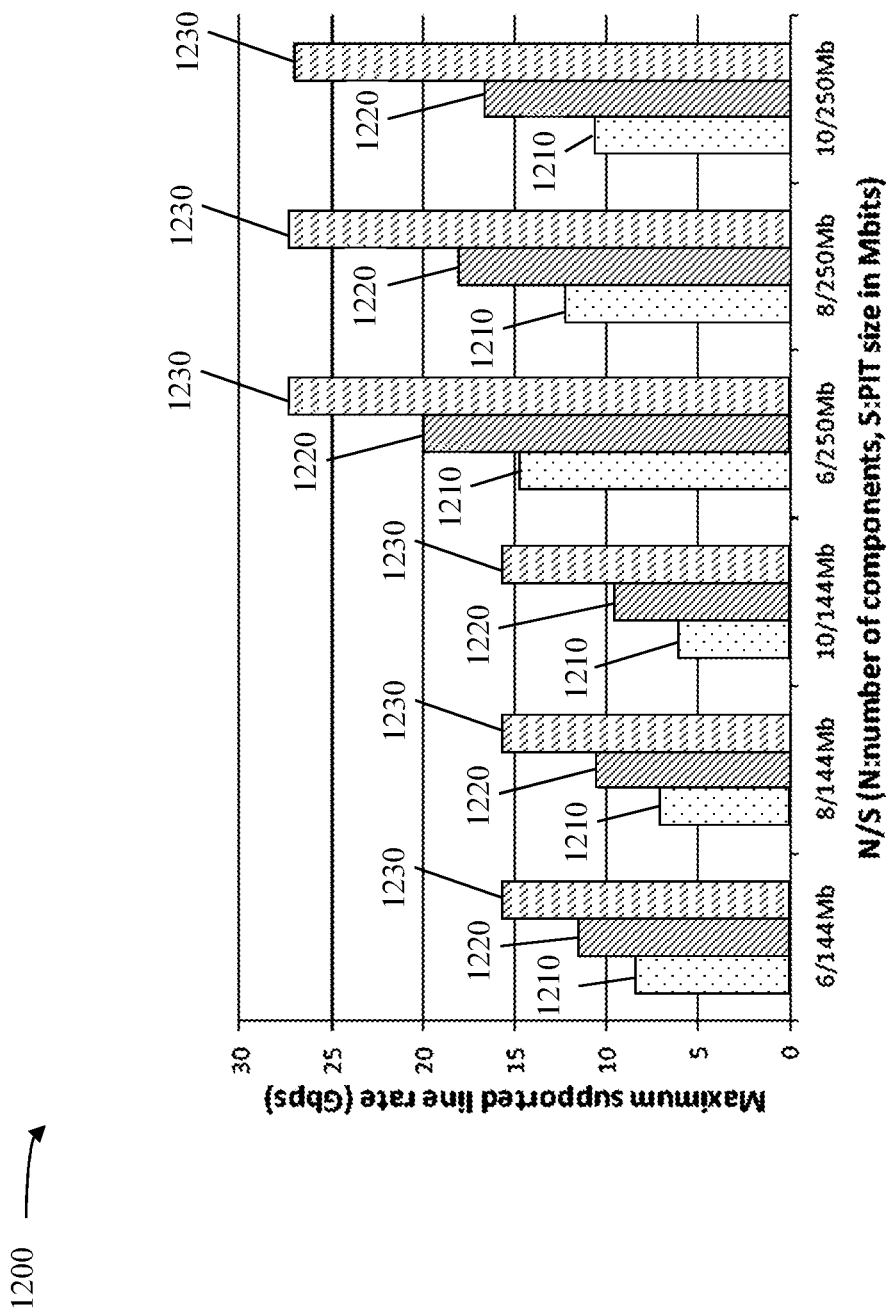
FIG. 12 is a graph comparing line rate performance of various storage schemes with static random-access memory (SRAM) storage devices.

FIG. 12 is a graph 1200 comparing line rate performance of various storage schemes with SRAM storage devices. In the graph 1200, the x-axis represents various combinations of the number of components or name components and PIT sizes, and the y-axis represents maximum supported line rate in units of gigabits per second (Gbps). The graph 1200 compares line rate performance of a name-based storage scheme, a hash-based storage scheme, and an optimized hash-base storage scheme that limits hash-based content IDs, such as the hash-based IDs 540, 640, and 710, to a length of about 128 bits. The line rate performance is determined from numerical analysis based on a PIT packet size of about 60 bytes. The bars 1210, 1220, and 1230 correspond to line rate performance for the name-based storage scheme, the hash-based storage scheme, and the optimized hash-based storage scheme, respectively. As shown, the hash-based storage scheme and the optimized hash-based storage scheme increase the line rate performance improvement when compared to the name-based storage scheme.

Figure 13:
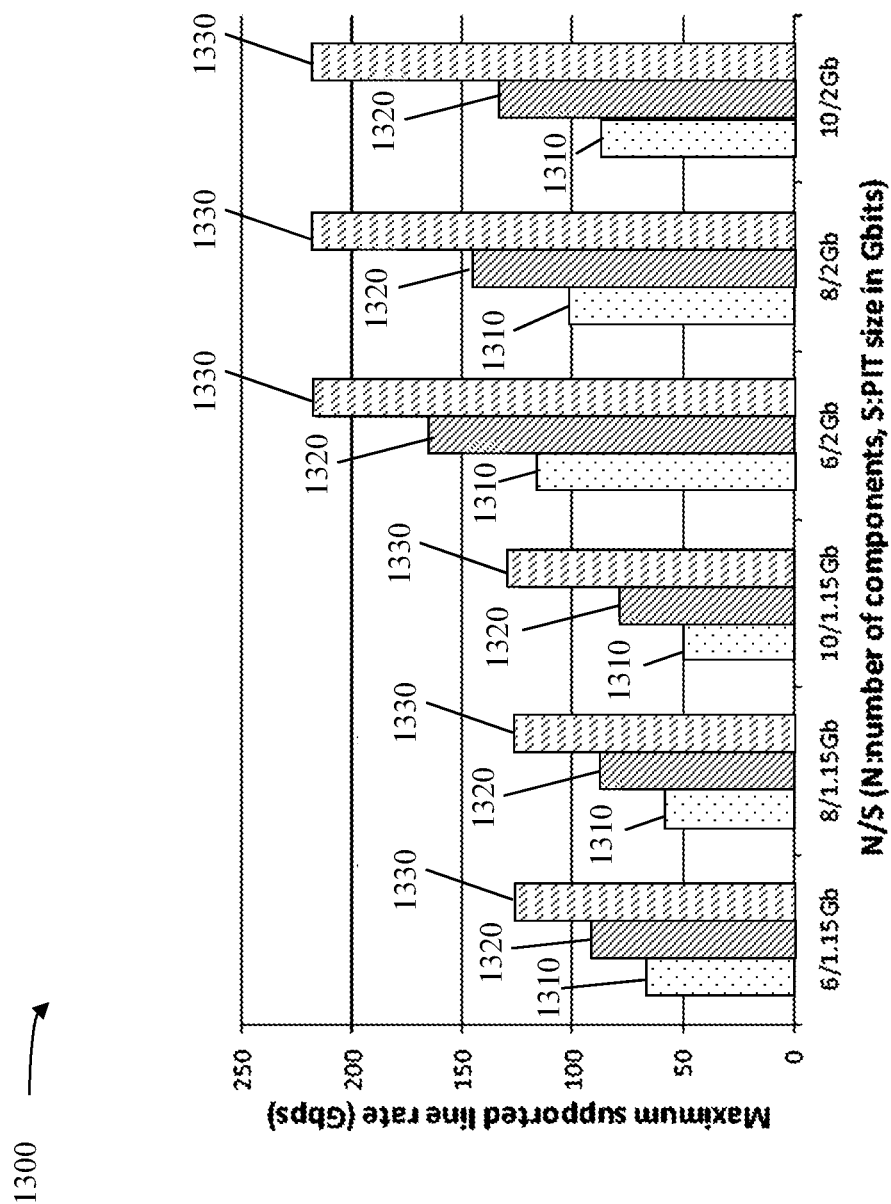
FIG. 13 is a graph comparing line rate performance of various storage schemes with reduced latency-dynamic random-access memory (RL-DRAM) storage devices.

FIG. 13 is a graph 1300 comparing line rate performance of various storage schemes with RL-DRAM storage devices. In the graph 1300, the x-axis represents various combinations of the number of components and the PIT sizes, and the y-axis represents maximum supported line rate in units of Gbps. The graph 1300 compares line rate performance of a name-based storage scheme, a hash-based storage scheme, and an optimized hash-base storage scheme that limits hash-based content IDs, such as the hash-based IDs 540, 640, and 710, to a length of about 128 bits. The line rate performance is generated from numerical analysis based on a PIT packet size of about 60 bytes. The bars 1310, 1320, and 1330 correspond to line rate performance for the name-based storage scheme, the hash-based storage scheme, and the optimized hash-based storage scheme, respectively. As shown, the hash-based storage scheme and the optimized hash-based storage scheme provide a significant line rate performance improvement when compared to the name-based forwarding scheme. By comparing the graphs 1200 and 1300, the RL-DRAM storage devices provide a significant higher line rate performance than the SRAM storage devices.

Figure 14:
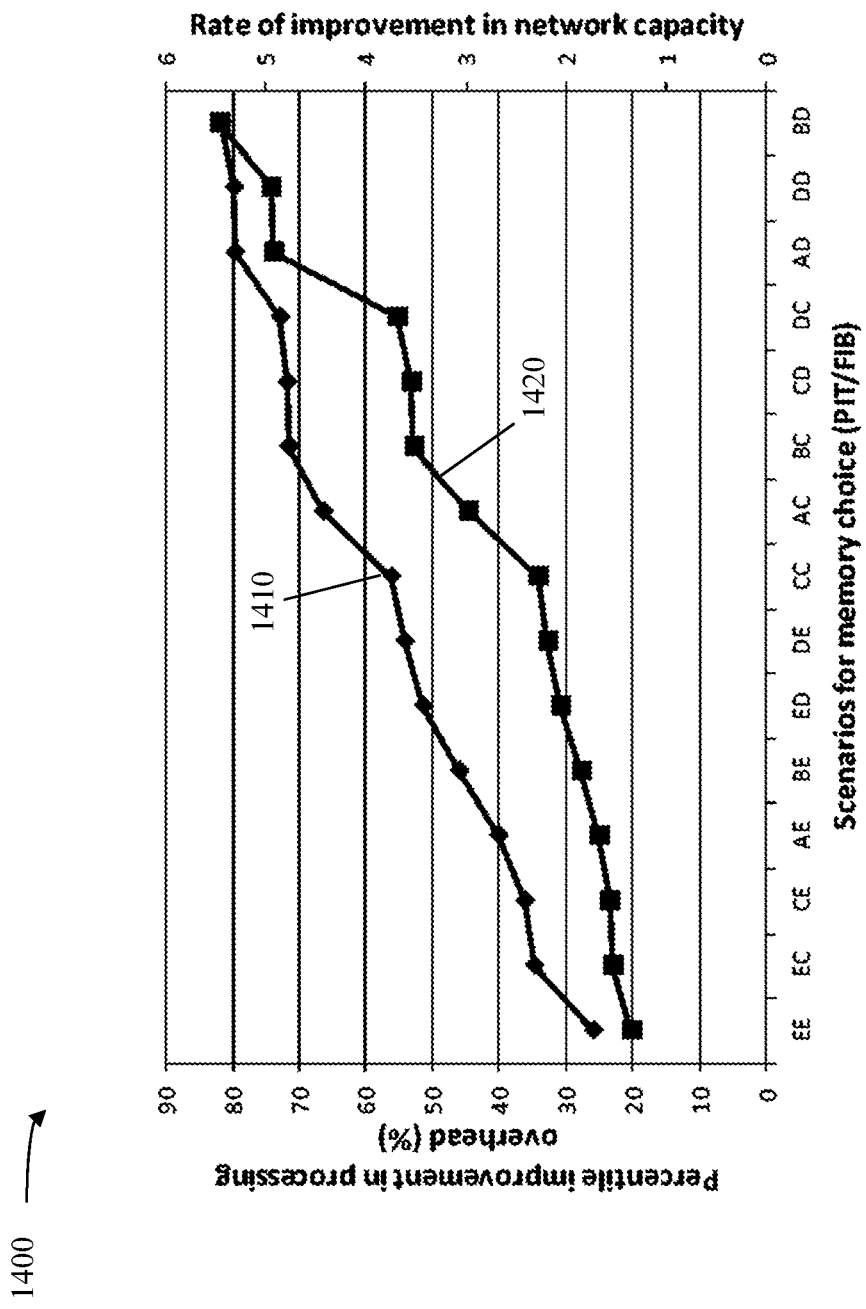
FIG. 14 is a graph illustrating improvement in processing overhead and network capacity from the employment of a name-based forwarding scheme to a hash-based forwarding scheme.

FIG. 14 is a graph 1400 illustrating improvement in processing overhead and network capacity from the employment of a name-based forwarding scheme to a hash-based forwarding scheme. The hash-based forwarding scheme employs similar mechanism as described in the method 400 and the schemes 600 and 700. In the graph 1400, the x-axis represents various combinations of memory types for storing PITs, the left y-axis represents percentile improvement in process overhead in units of %, and the right y-axis represents rate of improvement in network capacity. The graph 1400 is generated from numerical analysis. The following table lists the different combinations of memory types employed for the analysis:

TABLE 1

Combinations of Memory Types

| | Name-based Forwarding Scheme | Hash-based Forwarding Scheme |
|---|---|---|
| A | SRAM | SRAM |
| B | RL-DRAM | SRAM |
| C | RL-DRAM | RL-DRAM |
| D | DRAM | RL-DRAM |
| E | DRAM | DRAM |

For example, a memory type combination BD shown in the x-axis refers to the employment of RL-DRAM for PIT storage and DRAM for FIB storage with the name-based forwarding scheme, and the employment of SRAM for PIT storage and RL-DRAM for FIB storage with the hash-based forwarding scheme. The improvement is obtained by comparing the hash-based forwarding scheme against the name-based forwarding scheme. The plot 1410 illustrates improvement in processing overhead. The plot 1420 illustrates improvement in network capacity. As shown, the improvement in processing overheads and network capacity varies with the types of memory under employment. For example, the processing overhead for the hash-based forwarding scheme is improved by about 26% to about 80% over the name-based forwarding scheme. The network capacity for the hash-based forwarding scheme is improved by about 2 times (shown as 1421) to about 5.47 times (shown as 1422) over the name-based forwarding scheme.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A method implemented by a network element (NE), comprising:
obtaining a first mapping between a registered first content name identifying a content data in a content centric network (CCN) and a first hash value generated from at least a portion of the first content name as a hash-based content ID, wherein the first content name comprises a hierarchical structure in a namespace and a character string;
receiving, via a receiver of the NE, an initial packet comprising an initial hash value from the CCN;

determining, via a hardware processor of the NE, that the initial hash value in the received initial packet matches the first hash value for the hash-based content ID in the obtained first mapping;

replacing, via the hardware processor, the initial hash value in the received initial packet with the first content name in the matched first mapping to produce a translated initial packet; and forwarding, via a transmitter of the NE, the translated initial packet comprising the first content name to a connected end host over the CCN network.

2. The method of claim 1, wherein the connected end host is a producer of the content data, wherein the initial packet is an interest packet requesting the content data, and wherein the method further comprises:

receiving, via the receiver, a data packet comprising the content data and an initial content name from the connected end host;

determining, via the hardware processor, that the initial content name in the received data packet matches the first content name in the obtained first mapping;

replacing, via the hardware processor of the NE, the initial content name in the data packet with the first hash value in the matched first mapping to produce a translated data packet; and forwarding, via the transmitter, the translated data packet in the CCN indicating the content data in the translated data packet by the first hash value.

3. The method of claim 2, further comprising:

receiving, via the receiver, a content registration request message from the connected end host requesting registration for the first content name;

forwarding, via the transmitter, the content registration request message to a name resolution server (NRServ);

receiving, via the receiver, a content registration response message from the NRSery indicating the first mapping between the first content name and the first hash value; and storing, in a memory of the NE, the first mapping between the first content name and the first hash value in a local database entry, wherein the first mapping is obtained from the local database entry.

4. The method of claim 1, wherein the connected end host is a consumer of the content data, wherein the initial packet is a data packet carrying the content data, wherein the method further comprises:

receiving, via the receiver, an interest packet comprising an initial content name from the connected end host;

sending, via the transmitter, a mapping request message to a name resolution server (NRServ) indicating the received initial content name; and receiving, via the receiver, a mapping response message from the NRSery indicating a second mapping between the received initial content name and a second hash value;

wherein the initial content name in the received interest packet corresponds to the first hash value, wherein the second hash value in the received mapping response message corresponds to the first hash value, and wherein the first mapping is obtained from the second mapping in the received mapping response message.

5. The method of claim 4, further comprising:

replacing, via the hardware processor, the initial content name in the received interest packet with the second hash value in the received second mapping to produce a translated interest packet; and forwarding, via the transmitter, the translated interest packet in the CCN requesting the content data by the second hash value.

6. The method of claim 1, further comprising:

receiving, via the receiver, an interest packet comprising an initial content name from the connected end host;

receiving, via the receiver, a cryptographic hash function associated with the initial content name from a name resolution server (NRServ);

storing in a memory of the NE, the received cryptographic hash function in association with the initial content name;

computing, via the hardware processor, a second hash value for the initial content name according to the received cryptographic hash function;

replacing, via the hardware processor, the initial content name in the received interest packet with the computed second hash value to produce a translated interest packet; and forwarding, via the transmitter, the translated interest packet in the CCN requesting the content data by the second hash value.

7. The method of claim 1, wherein a character string in the first content name is a first sequential concatenation of a plurality of name components, and wherein the first hash value is generated from a second sequential concatenation of a subset of the plurality of name components according to a hash function.

8. The method of claim 7, wherein the plurality of name components are represented as $c_i$, wherein i is a value varying from 1 to k, wherein k is a positive integer, wherein the subset comprises the name components $c_1$ to $c_m$, and wherein m is a value between 1 and k.

9. A network element (NE) comprising:

a port configured to couple to a content centric network (CCN);

a memory configured to store a hash table comprising a bucket entry indexed by a bucket index, wherein the bucket entry comprises a sub-entry indicating the port as an interface associated with a registered first hash-based content identifier (ID), wherein the first hash-based content ID comprises a first hash value; and a hardware processor coupled to the memory and the port, wherein the hardware processor is configured to:

receive a packet comprising a second hash-based content ID comprising a second hash value;

locate the bucket entry in the hash table by determining that at least a first portion of the second hash value matches the bucket index;

determine that at least a portion of the second hash-based content ID in the received packet matches the first hash value in the sub-entry of the located bucket entry; and forward the received packet to the CCN via the port indicated in the matched sub-entry.

10. The NE of claim 9, wherein the second hash-based content ID identifies a content data in the CCN, wherein a content name of the content data comprises a plurality of variable-length name prefixes in a hierarchical namespace, and wherein the second hash value is generated from a minimum length name prefix of the content data.

11. The NE of claim 10, wherein the hash table is a pending interest table (PIT), wherein the received packet is a data packet carrying the content data, and wherein the hardware processor is further configured to determine that at least the portion of the second hash-based content ID matches the first hash value in the sub-entry by determining that a second portion of the second hash value in the second hash-based content ID matches the first hash value in the sub-entry.

12. The NE of claim 10, wherein the hash table is a pending interest table (PIT), wherein the received packet is a data packet carrying the content data, and wherein the hardware processor is further configured to determine that at least the portion of the second hash-based content ID matches the first hash value in the sub-entry by:
   applying a transform function to the second hash value to produce a transformed hash value; and
   determining that the transformed hash value matches the first hash value in the sub-entry.

13. The NE of claim 10, wherein the hash table is a forwarding information base (FIB), wherein the second hash-based content ID further comprises:
   a third hash value of a third length name prefix of the content data; and
   a fourth hash value of a fourth length name prefix of the content data, and
   wherein the hardware processor is further configured to determine that at least the portion of the second hash-based content ID matches the first hash value in the sub-entry by:
      combining the third hash value and the fourth hash value to produce a combined hash value; and
      determining that the combined hash value matches the first hash value in the sub-entry.

14. The NE of claim 10, wherein the hash table is a forwarding information base (FIB), and wherein the hardware processor is further configured to determine that at least the portion of the second hash-based content ID matches the first hash value in the sub-entry by:
   applying a transform function to the second hash value to produce a transformed hash value;
   combining the second hash value and the transformed hash value to produce a combined hash value; and
   determining that the combined hash value matches the first hash value in the sub-entry.

15. A name resolution server (NRServ) comprising:
   a receiver configured to receive a content registration request message from a network host requesting registration for a first content name in a content centric network (CCN), wherein the first content name comprises a hierarchical structure in a namespace and a character string;
   a hardware processor coupled to the receiver and configured to generate a hash-based content identifier (ID) by applying a first hash function to the first content name, wherein the hash-based content ID comprises a same hierarchical structure as the first content name in a hash-space; and
   a transmitter coupled to the hardware processor and configured to send a content registration response message indicating the hash-based content ID for the first content name in response to the received content registration request message, wherein the hash-based content ID enables the network host to forward a translated packet derived from a received packet to a connected end host by replacing a received hash value of the received packet with the registered first content name.

16. The NRServ of claim 15, wherein the character string in the content name is a sequential concatenation of a plurality of name components, and wherein the hardware processor is further configured to generate the hash-based content ID by:
   applying the first hash function to a first subset of the plurality of name component to produce a first hash value;
   applying a second hash function to a second subset of the plurality of name components produce a second hash value; and
   arranging the second hash value subsequent to the first hash value in the hash-based content ID.

17. The NRServ of claim 16, wherein the first hash function and the second hash function comprise a same 32-bit hash function.

18. The NRServ of claim 16, wherein the first hash function is a 64-bit hash function, and wherein the second hash function is a 32-bit hash function, wherein the plurality of name components are represented as $c_i$, wherein i is a value varying from 1 to k, wherein k is a positive integer, wherein the first subset comprises the name component $c_1$, and wherein the second subset comprises the name components $c_1$ and $c_2$.

19. The NRServ of claim 16, wherein the hash function is a 64-bit hash function, wherein the plurality of name components are represented as $c_i$, wherein i varies from 1 to k, wherein k is a positive integer, wherein the first subset comprises the name component $c_1$, wherein the second subset comprises the name components $c_1$ and $c_2$, and wherein the hardware processor is further configured to generate the hash-based content ID by shortening the second hash value to a 32-bit value prior to arranging the second hash value in the hash-based content ID.

20. The NRServ of claim 15, further comprising a memory coupled to the hardware processor and configured to store a name-to-hash database, wherein the receiver is further configured to receive a hash mapping request message indicating a second content name, wherein the hardware processor is further configured to:
   generate an entry in the database to store a mapping between the first content name, the generated hash-based content ID, and the first hash function; and
   determine that the second content name in the hash mapping request message matches the first content name in the database entry, and
   wherein the transmitter is further configured to send a hash mapping response message indicating the mapping between the first content name, the hash-based content ID, and the first hash function in the matched database entry.

* * * * *

UNITED STATES PATENT AND TRADEMARK OFFICE
CERTIFICATE OF CORRECTION

PATENT NO. : 9,774,531 B2
APPLICATION NO. : 14/864299
DATED : September 26, 2017
INVENTOR(S) : Aytac Azgin et al.

It is certified that error appears in the above-identified patent and that said Letters Patent is hereby corrected as shown below:

In the Claims

Column 16, Lines 57-67, through Column 17, Lines 1-12, Claim 1 should read:
1. A method implemented by a network element (NE), comprising:
 obtaining a first mapping between a first content name identifying a content data in a content centric network (CCN) and a first hash value generated from a portion of the first content name as a hash-based content identifier (ID), wherein the first content name comprises a hierarchical structure in a namespace and wherein the first content name is registered in the CCN;
 receiving, via a receiver of the NE, an initial packet comprising an initial hash value from the CCN;
 determining, via a hardware processor of the NE, that the initial hash value in the received initial packet matches the first hash value for the hash-based content ID in the obtained first mapping;
 replacing, via the hardware processor, the initial hash value in the received initial packet with the first content name in the matched first mapping to produce a translated initial packet; and
 forwarding, via a transmitter of the NE, the translated initial packet comprising the first content name to a connected end host over the CCN.

Column 17, Lines 30-44, Claim 3 should read:
3. The method of claim 2, further comprising:
 receiving, via the receiver, a content registration request message from the connected end host requesting registration for the first content name;
 forwarding, via the transmitter, the content registration request message to a name resolution server (NRServ);
 receiving, via the receiver, a content registration response message from the NRServ, indicating the first mapping between the first content name and the first hash value; and
 storing, in a memory of the NE, the first mapping between the first content name and the first hash value in a local database entry,
 wherein the first mapping is obtained from the local database entry.

Signed and Sealed this
Fourteenth Day of November, 2017

Joseph Matal
*Performing the Functions and Duties of the
Under Secretary of Commerce for Intellectual Property and
Director of the United States Patent and Trademark Office*

CERTIFICATE OF CORRECTION (continued)
U.S. Pat. No. 9,774,531 B2

Column 17, Lines 45-64, Claim 4 should read:
4. The method of claim 1, wherein the connected end host is a consumer of the content data, wherein the initial packet is a data packet carrying the content data, wherein the method further comprises:
    receiving, via the receiver, an interest packet comprising an initial content name from the connected end host;
    sending, via the transmitter, a mapping request message to a name resolution server (NRServ) indicating the received initial content name; and
    receiving, via the receiver, a mapping response message from the NRServ indicating a second mapping between the received initial content name and a second hash value;
    wherein the initial content name in the received interest packet corresponds to the first hash value,
    wherein the second hash value in the received mapping response message corresponds to the first hash value, and
    wherein the first mapping is obtained from the second mapping in the received mapping response message.

Column 18, Lines 36-56, Claim 9 should read:
9. A network element (NE) comprising:
    a port configured to couple to a content centric network (CCN);
    a memory configured to store a hash table comprising a bucket entry indexed by a bucket index, wherein the bucket entry comprises a sub-entry indicating the port as an interface associated with a first hash-based content identifier (ID), wherein the first hash-based content ID comprises a first hash value and wherein the first hash-based ID is registered in the CCN; and
    a hardware processor coupled to the memory and the port, wherein the hardware processor is configured to:
        receive a packet comprising a second hash-based content ID comprising a second hash value;
        locate the bucket entry in the hash table based on a first portion of the second hash value which matches the bucket index; and
        forward the received packet to the CCN via the port indicated in the matched sub-entry, wherein a portion of the second hash-based content ID in the received packet matches the first hash value in the sub-entry of the located bucket entry.

Column 18, Lines 63-76, through Column 19, Lines 1-4, Claim 11 should read:
11. The NE of claim 10, wherein the hash table is a pending interest table (PIT), wherein the received packet is a data packet carrying the content data, and wherein the hardware processor is further configured to determine that the portion of the second hash-based content ID matches the first hash value in the sub-entry by determining that a second portion of the second hash value in the second hash-based content ID matches the first hash value in the sub-entry.

Column 19, Lines 15-29, Claim 13 should read:
13. The NE of claim 10, wherein the hash table is a forwarding information base (FIB), wherein the second hash-based content ID further comprises:
    a third hash value of a third length name prefix of the content data; and
    a fourth hash value of a fourth length name prefix of the content data, and

CERTIFICATE OF CORRECTION (continued)
U.S. Pat. No. 9,774,531 B2 wherein the hardware processor is further configured to determine that the portion of the second hash-based content ID matches the first hash value in the sub-entry by:

combining the third hash value and the fourth hash value to produce a combined hash value; and determining that the combined hash value matches the first hash value in the sub-entry.

Column 19, Lines 30-40, Claim 14 should read:
14. The NE of claim 10, wherein the hash table is a forwarding information base (FIB), and wherein the hardware processor is further configured to determine that the portion of the second hash-based content ID matches the first hash value in the sub-entry by:

applying a transform function to the second hash value to produce a transformed hash value;

combining the second hash value and the transformed hash value to produce a combined hash value; and determining that the combined hash value matches the first hash value in the sub-entry.

Column 20, Lines 6-18, Claim 16 should read:
16. The NRServ of claim 15, wherein the character string in the content name is a sequential concatenation of a plurality of name components, and wherein the hardware processor is further configured to generate the hash-based content ID by:

applying the first hash function to a first subset of the plurality of name components to produce a first hash value;

applying a second hash function to a second subset of the plurality of name components to produce a second hash value; and arranging the second hash value subsequent to the first hash value in the hash-based content ID.